United States Patent
Li et al.

(10) Patent No.: US 8,184,727 B2
(45) Date of Patent: May 22, 2012

(54) ROBUST INTEGER CARRIER FREQUENCY OFFSET ESTIMATOR

(75) Inventors: Yushan Li, Shanghai (CN); Kun Wah Stanley Yip, Shanghai (CN)

(73) Assignee: ST-Ericsson, SA, Plan-les-Ouates (CH)

( * ) Notice: Subject to any disclaimer, the term of this patent is extended or adjusted under 35 U.S.C. 154(b) by 684 days.

(21) Appl. No.: 12/324,564

(22) Filed: Nov. 26, 2008

(65) Prior Publication Data
US 2009/0147873 A1 Jun. 11, 2009

(30) Foreign Application Priority Data
Nov. 29, 2007 (CN) .......................... 2007 1 0196533

(51) Int. Cl.
*H04L 5/12* (2006.01)
(52) U.S. Cl. ........................................ 375/260; 375/261
(58) Field of Classification Search .................. 375/260, 375/261, 267, 224
See application file for complete search history.

(56) References Cited

U.S. PATENT DOCUMENTS

| | | | |
|---|---|---|---|
| 6,438,173 B1 * | 8/2002 | Stantchev | 375/260 |
| 6,771,699 B1 * | 8/2004 | Karaoquz et al. | 375/224 |
| 2007/0268978 A1 * | 11/2007 | Kazakevich et al. | 375/261 |
| 2008/0008258 A1 * | 1/2008 | Tanabe | 375/267 |
| 2009/0168641 A1 * | 7/2009 | Kao et al. | 370/208 |

* cited by examiner

*Primary Examiner* — Emmanuel Bayard
(74) *Attorney, Agent, or Firm* — Howison & Arnott, L.L.P.

(57) ABSTRACT

A robust integer carrier frequency offset estimation method for OFDM systems is disclosed. Compared with conventional methods which use either two consecutive OFDM symbols or only one training symbol, the method is insensitive to the timing offset as long as the channel spread is shorter than the OFDM cyclic prefix length. Most importantly, it does not require any information on the scrambling code used in systems such as STiMi. The method improves the accuracy of integer carrier frequency offset, especially in channels with long and strong echoes. It offers the receiver more freedom in setting the FFT window since it is insensitive to the timing offset.

24 Claims, 3 Drawing Sheets

ROBUST INTEGER CARRIER FREQUENCY OFFSET ESTIMATOR

CROSS-REFERENCE TO RELATED APPLICATION(S) AND CLAIM OF PRIORITY

This application claims the benefit under 35 U.S.C. §119(a) to a Chinese patent application filed in the State Intellectual Property Office of the People's Republic of China on Nov. 29, 2007 and assigned Serial No. 200710196533.1, the entire disclosure of which is hereby incorporated by reference.

TECHNICAL FIELD OF THE INVENTION

The invention relates generally to communication systems and, more particularly, to mobile multimedia broadcasting systems.

BACKGROUND OF THE INVENTION

Satellite Terrestrial Interactive Multi-service Infrastructure (STiMi) is a mobile multimedia broadcasting standard released by the Chinese State Administration of Radio Film and Television (SARFT). The standard specifies a mobile multimedia broadcasting system that operates in the frequency range of 30 MHz~3000 MHz. This standard is applicable to broadcasting systems which transmit multimedia signals such as television, radio and data information wirelessly through satellites and/or ground transmission. In the physical layer, STiMi uses Orthogonal Frequency Division Multiplexing (OFDM) as its air interface. OFDM is capable of providing high rate transmission. In OFDM, a cyclic prefix (CP) is inserted at the transmitter to cyclically extend one OFDM symbol. The inserted CP is used to absorb inter-symbol-interference (ISI).

Carrier frequency offset (CFO) compensation is a critical issue for receiver design. CFO is mainly caused by a mismatch between the transmitter oscillator and the receiver oscillator and can be split into an integer part and a fractional part. The fractional CFO will result in inter-symbol-interference (ISI) as well as inter-carrier-interference (ICI). The orthogonality among sub-carriers is no longer retained due to the fractional CFO. Numerous methods for coarse timing synchronization and fractional CFO compensation have been proposed.

The present invention addresses particularly the estimation of integer CFO. In the presence of integer CFO, the received data in the frequency domain is a time-shifted version of the original data sequence in the frequency domain. A receiver fails to recover useful data without integer CFO compensation.

Many solutions have been proposed to the problem of CFO estimation. In one proposed solution, a CFO estimator is based on two consecutive OFDM symbols. However, in STiMi, this would require the knowledge of the scrambling code since the pilots are all scrambled in the frequency domain. In another proposed solution, a guard-band power detection method is proposed to estimate the CFO based on the null sub-carriers. This method works well only in high signal-to-noise ratio (SNR) scenarios. Other methods with low complexity (e.g., M.-H. Hsieh and C.-H. Wei, "A low-complexity frame synchronization and frequency offset compensation scheme for OFDM systems over fading channels", *IEEE Trans. on Vehicular Technology*, Vol. 48, No. 5, September 1999, 1596-1609) have been proposed, but their specialized data-aided structure or their stringent requirements on symbol timing synchronization limits their application. Due to the poor performance of coarse timing synchronization, especially in channels with long and strong echoes or in a single frequency network (SFN), integer CFO estimation methods should be independent of the timing offset.

SUMMARY OF THE INVENTION

Methods and apparatus for integer CFO estimation are described that are largely insensitive to timing offset. In addition, they do not require the information of the scrambling code. The effect of the timing offset is removed by first calculating the conjugate product of the channel estimate on adjacent sub-carriers and then taking the absolute value of the product. This method improves the accuracy of integer CFO especially in channels with long and strong echoes. Timing synchronization requirements become less stringent, resulting in better performance for the receiver.

Another advantage of the present arrangement is that it facilitates fast slot synchronization for STiMi. Due to its special frame/slot structure, STiMi has a stringent latency requirement. Since the proposed approach works well with a very coarse timing synchronizer, fast slot synchronization for STiMi is easily implemented.

Other features and advantages will be understood upon reading and understanding the detailed description of exemplary embodiments, found herein below, in conjunction with reference to the drawings, a brief description of which is provided below.

DETAILED DESCRIPTION OF EXEMPLARY EMBODIMENTS

There follows a more detailed description of the present invention. Those skilled in the art will realize that the following detailed description is illustrative only and is not intended to be in any way limiting. Other embodiments of the present invention will readily suggest themselves to such skilled persons having the benefit of this disclosure. Reference will now be made in detail to embodiments of the present invention as illustrated in the accompanying drawings. The same reference indicators will be used throughout the drawings and the following detailed description to refer to the same or like parts.

In practice, before decoding useful data, it is necessary for an OFDM receiver to complete timing synchronization, CFO compensation, channel estimation and sampling frequency offset recovery. These issues have been dealt with and thoroughly analyzed in the literature. A typical synchronization procedure is as follows:

Coarse timing synchronization→Fractional CFO compensation→Integer CFO compensation→Fine timing synchronization→Channel estimation.

Figure 1:
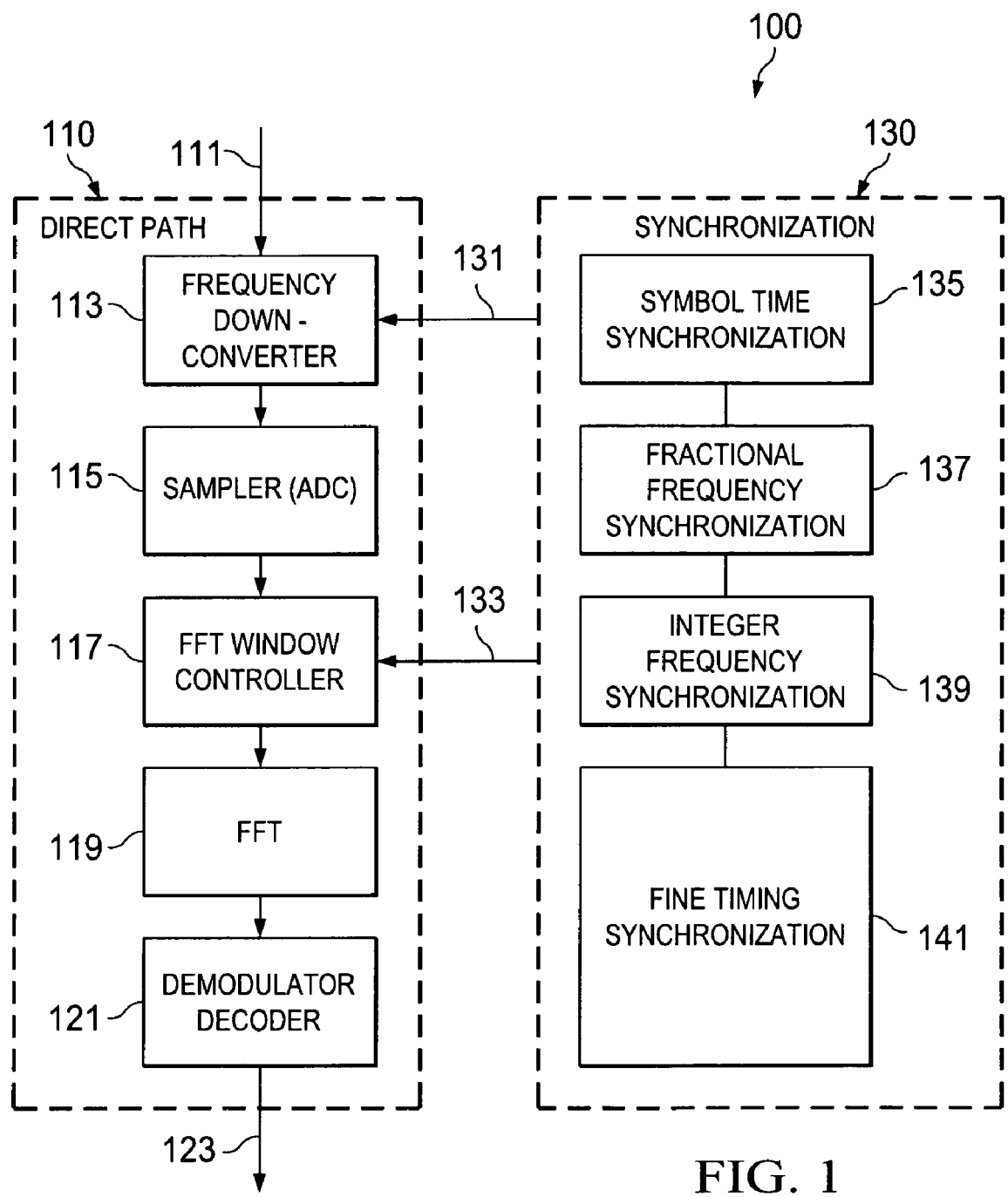
FIG. 1 is a block diagram of an OFDM receiver in which the present invention may be used.

Referring to FIG. 1, a block diagram is shown of an OFDM receiver in which the present invention may be used. A receiver 100 includes a direct receiver path 110 and a synchronization section 130. In the direct receiver path, a received signal 111 is down-converted by a frequency down-converter 113, sampled by a sampler (ADC) 115, windowed by an FFT window controller 117, transformed by an FFT block 119 and demodulated and decoded by a demodulator/decoder 121 to produce an output signal 123.

The synchronization section 130 applies first control information 131 to the frequency down-converter 113 and applies second control information 133 to the FFT window controller 117. The synchronization section includes a symbol time synchronization block 135, a fractional frequency synchronization block 137, an integer frequency synchronization block 139 (described in greater detail below) and a fine timing synchronization block 141.

Conventional methods of coarse timing synchronization and fractional CFO estimation may be used together with the integer CFO estimation techniques described herein. One such coarse timing synchronization method is described in T. Schmidl and D. Cox, "Robust frequency and timing synchronization for OFDM", *IEEE Trans. on Comm.*, Vol. 45, No. 12, December 1997, pp. 1613-1621 ("Schmidl"). In Schmidl, the position of a correlation peak is used to identify the FFT window starting point. Due to long and strong echoes in the channel impulse response, the timing metric reaches a plateau. This becomes problematic for multi-path channels, especially for channels with long and strong echoes. Averaging over many symbols is not feasible due to the special time slot structure in STiMi. The timing will drift from the desired position by potentially hundreds of samples; thus, severe ISI appears, which affects conventional integer CFO estimation methods. Most integer CFO estimation methods fail in this case. However, integer CFO estimation arrangements described herein are largely insensitive to timing offset.

Figure 2:
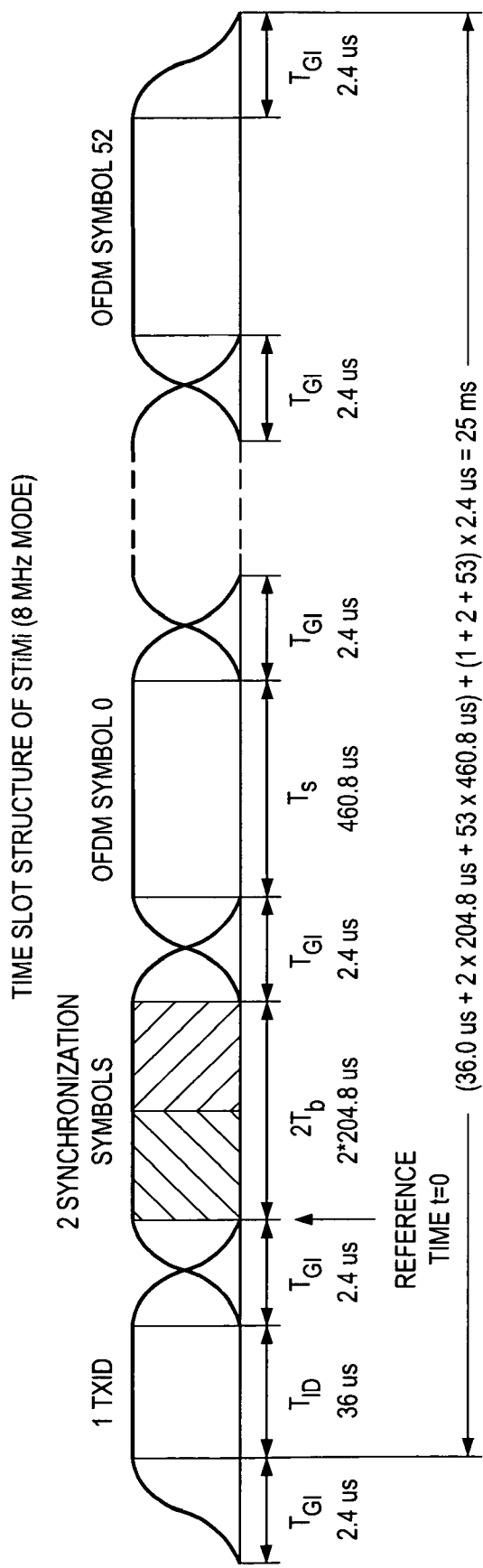
FIG. 2 is a diagram showing the time slot structure of STiMi.

FIG. 2 shows the time slot structure of STiMi (8 MHz mode). Two identical synchronization symbols are inserted between every time slot for synchronization purposes. The sampling rate is 10 MHz. The FFT sizes for the synchronization symbol and the OFDM symbols are 2048 and 4096, respectively. The synchronization symbol is a known pseudo random noise (PN) sequence in the frequency domain. The CP length for each OFDM symbol is 512. In between two consecutive symbols, a windowing cosine-shaped time waveform is inserted as a guard interval (GI) to reduce adjacent sub-carrier interference and make the transmitted spectrum more compact. There is no GI between the two identical synchronization symbols nor is there any CP for the synchronization symbols.

It should be noted that data, including payload data, continual pilots and discrete pilots, are scrambled in the frequency domain. The receiver cannot make use of the pilots unless the scrambling code is known. There are a total of six initial phase options for the scrambling code.

In the following description, a noise free environment is assumed, and the fractional CFO is assumed to have been compensated. Good performance in practical scenarios with additive white Gaussian noise (AWGN) noise and residual fractional CFO may be demonstrated via computer simulation.

The received synchronization symbol in discrete form is given by:

$$r(k) = \frac{1}{N}\sum_{n=0}^{N-1} X(n)H(n)e^{j2\pi(n+\zeta_I)\frac{k}{N}}, 0 \le k \le 2N-1, \quad (1)$$

where $X(n)$, $H(n)$, $N=2048$ and $\zeta_I$ denote the PN sequence in the frequency domain, the channel transfer function (CTF) on the n-th sub-carrier, the number of sub-carriers and the integer carrier frequency offset, respectively.

Figure 3:
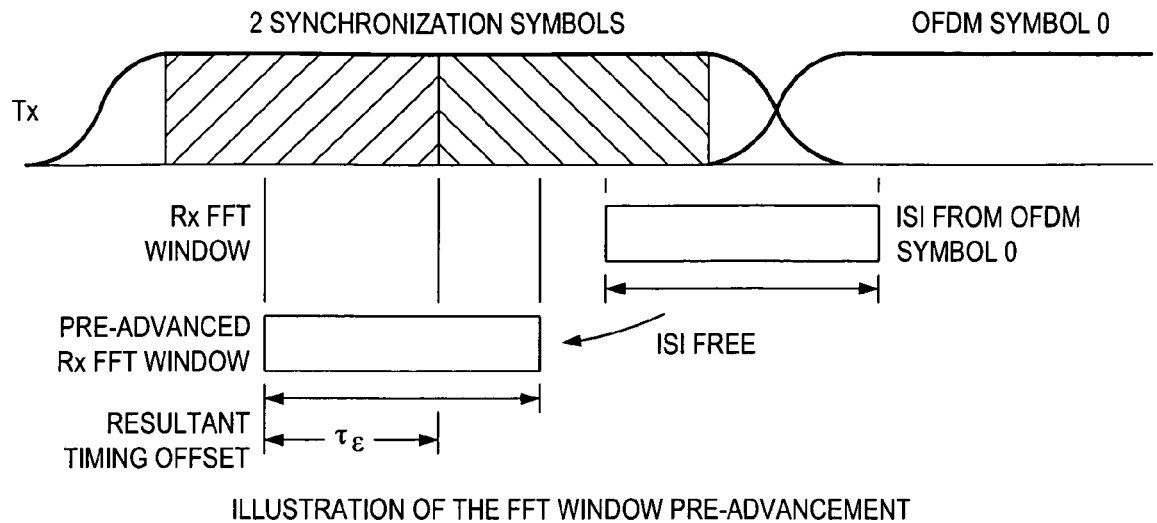
FIG. 3 is a diagram showing fast Fourier transform (FFT) window pre-advancement.

Due to poor performance of coarse timing synchronization, particularly in channels with long and strong echoes, information from the next symbol will likely be involved in the FFT window, which may cause ISI as well as ICI. In order to obtain an ISI-free signal, the FFT window is pre-advanced 512 samples, which is the length of the CP in STiMi. Assuming that the longest channel spread is shorter than 512, the symbols in the new FFT window are—ISI free. It should be noted that there remains a timing offset but no ISI. Although an ISI-free block can be obtained, the correct timing is still unknown to the receiver. The FFT window pre-advancement is illustrated in FIG. 3.

The presence of a timing offset causes a phase rotation proportional to the sub-carrier index. If the resultant timing offset after window pre-advancement is $\tau_\epsilon$, the l-th bin of the FFT output is:

$$U(l) = e^{j2\pi\frac{l}{N}\tau_\epsilon}X((l-\zeta_I)\bmod N)H((l-\zeta_I)\bmod N), \quad (2)$$
$$0 \le l \le N-1.$$

Therefore, $$U(l)X^*((l-\zeta_I)\bmod N) = \begin{cases} e^{j2\pi\frac{l}{N}\tau_\epsilon}H((l-\zeta_I)\bmod N), & (l-\zeta_I)\bmod N \in L \\ 0, & \text{otherwise,} \end{cases} \quad (3)$$

where L denotes the set of active non-virtual sub-carriers (a total of 1536 non-virtual sub-carriers in one synchronization symbol). The response of the ((l−q)mod N)-th sub-channel is estimated with a phase shift as follows:

$$\hat{H}(l; q; \tau_\epsilon) = \hat{H}(l; q)e^{j2\pi\frac{l}{N}\tau_\epsilon} = U(l)X^*((l-q)\bmod N), \quad (4)$$

where l∈(L+q) mod N and q∈I (I is given by $[-\zeta_{I,max}, \zeta_{I,max}]$ where is a preset maximum acquisition range).

In the prior art, the assumption is made that $\hat{H}(l;\zeta_I;0)\approx\hat{H}(l+1;\zeta_I;0)$. When there is no timing offset, e.g. $\tau_\epsilon=0$, the above assumption is valid for most situations. Unfortunately, when $\tau_\epsilon\neq 0$, the following result (5) can be derived from (4), namely:

$$\hat{H}(l+1; q; \tau_\epsilon) - \hat{H}(l; q; \tau_\epsilon) = \hat{H}(l+1; q)e^{j2\pi\frac{l+1}{N}\tau_\epsilon} - \hat{H}(l; q)e^{j2\pi\frac{l}{N}\tau_\epsilon} = \quad (5)$$
$$\left(\hat{H}(l+1; q)e^{j2\pi\frac{\tau_\epsilon}{N}} - \hat{H}(l; q)\right)e^{j2\pi\frac{l}{N}\tau_\epsilon}.$$

Due to the phase rotation caused by the timing offset, $$\hat{H}(l+1; q)e^{j2\pi\frac{l+1}{N}\tau_\epsilon} \approx \hat{H}(l; q)e^{j2\pi\frac{l}{N}\tau_\epsilon}$$

does not hold, especially when $\tau_\epsilon$ is large. Therefore, the accuracy of the prior art integer CFO estimator will drop significantly.

Instead of calculating the differences, the present method takes the conjugate product:

$$\left(\hat{H}(l+1;q)e^{j2\pi\frac{l+1}{N}\tau_\varepsilon} - \hat{H}(l;q)e^{j2\pi\frac{l}{N}\tau_\varepsilon}\right) \quad (6)$$
$$\left(\hat{H}(l;q)e^{j2\pi\frac{l}{N}\tau_\varepsilon} - \hat{H}(l-1;q)e^{j2\pi\frac{l-1}{N}\tau_\varepsilon}\right)^* =$$
$$(U(l+1)X^*((l+1-q)\bmod N) - U(l)X^*((l-q)\bmod N)) \cdot$$
$$(U(l)X^*((l-q)\bmod N) - U(l-1)X^*((l-1-q)\bmod N))^*.$$

Meanwhile, $$\left(\hat{H}(l+1;q)e^{j2\pi\frac{l+1}{N}\tau_\varepsilon} - \hat{H}(l;q)e^{j2\pi\frac{l}{N}\tau_\varepsilon}\right) \quad (7)$$
$$\left(\hat{H}(l;q)e^{j2\pi\frac{l}{N}\tau_\varepsilon} - \hat{H}(l-1;q)e^{j2\pi\frac{l-1}{N}\tau_\varepsilon}\right)^* =$$
$$\left(\hat{H}(l+1;q)e^{j2\pi\frac{\tau_\varepsilon}{N}} - \hat{H}(l;q)\right)$$
$$e^{j2\pi\frac{l}{N}\tau_\varepsilon}\left(\hat{H}(l;q)e^{j2\pi\frac{\tau_\varepsilon}{N}} - \hat{H}(l-1;q)\right)^* e^{-j2\pi\frac{l-1}{N}\tau_\varepsilon} =$$
$$\left(\hat{H}(l+1;q)e^{j2\pi\frac{\tau_\varepsilon}{N}} - \hat{H}(l;q)\right)\left(\hat{H}(l;q)e^{j2\pi\frac{\tau_\varepsilon}{N}} - \hat{H}(l-1;q)\right)^* e^{j2\pi\frac{\tau_\varepsilon}{N}} =$$
$$2|\hat{H}(l;q)|^2\left(1 - \cos 2\pi\frac{\tau_\varepsilon}{N}\right)e^{j2\pi\frac{\tau_\varepsilon}{N}}.$$

In (6), it is assumed that the response of the sub-channel is very close to its neighboring sub-channel response, i.e. $\hat{H}(l;\zeta_l)\approx\hat{H}(l+1;\zeta_l)$. It is evident from (7) that the effect of the timing offset $\tau_\varepsilon$ is removed from taking the absolute value of both sides.

Figure 4:
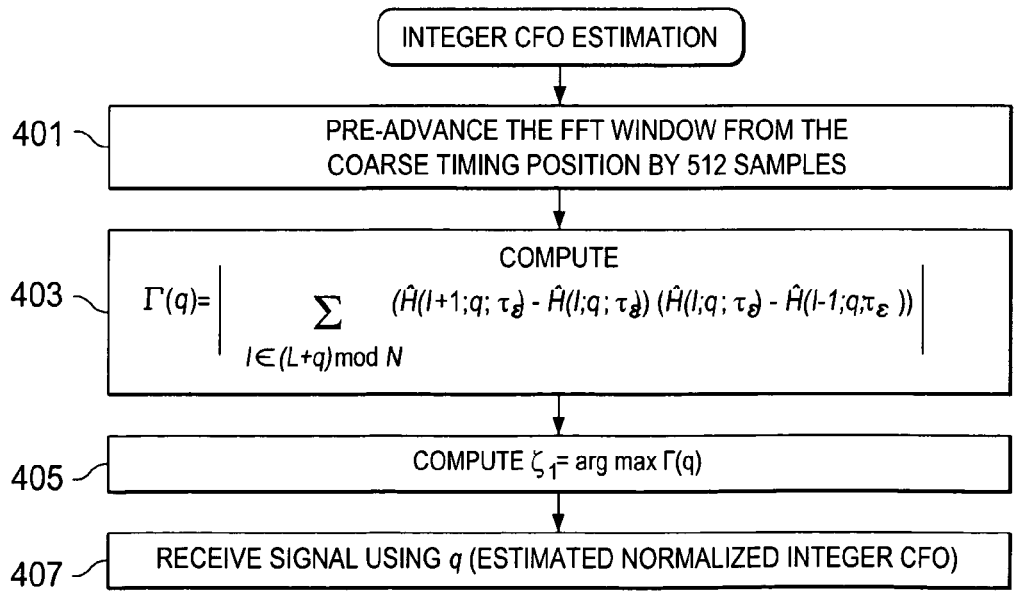
FIG. 4 is a flowchart illustrating a method of the present invention.

Using the property that the response of the sub-channel is very close to its neighboring sub-channel response, i.e. $\hat{H}(l;\zeta_l)\approx\hat{H}(l+1;\zeta_l)$, and the randomness property of the resultant sequence after multiplying a PN sequence with its shifted replica, the integer CFO can be estimated in accordance with the procedure illustrated in FIG. 4, as follows:

1. Pre-Advance the FFT window from the coarse timing position by 512 samples (step 401).
2. Compute $$\Gamma(q) = \left|\sum_{l\in(L+q)\bmod N}\left(\hat{H}(l+1;q;\tau_\varepsilon) - \hat{H}(l;q;\tau_\varepsilon)\right)\right. \quad \text{(step 403)}$$
$$\left.\left(\hat{H}(l;q;\tau_\varepsilon) - \hat{H}(l-1;q;\tau_\varepsilon)\right)^*\right|,$$

where $$\hat{H}(l;q;\tau_\varepsilon) = \hat{H}(l;q)e^{j2\pi\frac{l}{N}\tau_\varepsilon} = U(l)X^*((l-q)\bmod N)$$

and U(l) is the FFT output.
3.

$$\hat{\zeta}_l = \underset{q}{\operatorname{argmax}}\Gamma(q). \quad \text{(step 405)}$$

The tentative normalized integer CFO q that results in the maximum total power is considered to be the estimated normalized integer CFO and is used to receive the signal (step 407).

While the calculation of $\Gamma(q)$ involves all the active non-virtual sub-carriers, to further reduce the computational complexity, one may select only a few sub-carriers among the active sub-carrier set for computing $\Gamma(q)$.

The following simplified example will serve to further illustrate the present method.

Assume that N=5, there are 3 active non-virtual sub-carriers in the system, and that the timing offset is $\tau_\varepsilon=-3$. Noise-free transmission is further assumed.

Assume that the transmitted data in the frequency domain (the synchronization sequence SYN) is:
0 1 −1 1 0
The resulting sub-channel response may be represented as:
1+j 1+j 1+j 1+j 1+j
With timing offset $\tau_\varepsilon=-3$, the received signal in the frequency domain is:

$$0 \quad (1+j)e^{j2\pi\frac{1}{5}(-3)} \quad (-1-j)e^{j2\pi\frac{2}{5}(-3)} \quad (1+j)e^{j2\pi\frac{3}{5}(-3)} \quad 0$$
$$\Rightarrow 0 \quad -1.3968-0.2212j \quad -1.2601+0.6420j \quad -0.6420+1.2601j \quad 0$$

Now if the data sequence above is descrambled with the correct SYN at the correct position, i.e., (0 1 −1 1 0), there results Case 1:

=>0−1.3968−0.2212j1.2601−0.6420j−0.6420+1.2601j0, which may be represented as: 0 a b c 0. Then, Sum=|(a−0)*conj(b−a)+(b−a)*conj(c−b)+(c−b)*conj(0−c)|=14.6619.

If the integer CFO hypothesis is wrong and as a result the data is descrambled with a wrong code, e.g. (0 0 1 −1 1), there results Case 2:

=>00−1.2601+0.6420j0.6420−1.2601j0, which may be represented as: 0 0 a b 0. Then, Sum=|(0−0)*conj(a−0)+(a−0)*conj(b−a)+(b−a)*conj(0−b)|=7.6084.

If the integer CFO hypothesis is wrong and as a result the data is descrambled with a different wrong code, e.g. (1 −1 1 0 0), there results Case 3:

=>01.3968+0.2212j−1.2601+0.6420j00, which may be represented as: 0 a b 0 0. Then, Sum=|(a−0)*conj(b−a)+(b−a)*conj(0−b)+(0−b) *0|=7.6085.

Based on Cases 1, 2, and 3, the method chooses the results (integer CFO hypothesis) of Case 1 since it results in the maximum sum. Hence the amount of shift of the frequency data becomes known.

Although embodiments of the present invention have been described in detail, it should be understood that various changes, substitutions and alternations can be made without departing from the spirit and scope of the inventions as defined by the appended claims.

What is claimed is:

1. A method of receiving an Orthogonal Frequency Division Multiplexing (OFDM) transmission, the method comprising:
    calculating, by an OFDM receiver for each of a plurality of possible integer carrier frequency offset values, a magnitude of a sum over selected sub-carriers of the OFDM transmission of products of a first quantity and a second quantity, wherein the first quantity is a difference between estimated channel responses of a first selected sub-carriers of the OFDM transmission, and the second quantity is a complex conjugate of a difference between estimated channel responses of a second selected sub-carriers of the OFDM transmission;
    estimating, by the OFDM receiver, as an integer carrier frequency offset value a possible integer carrier frequency offset value that produces the largest magnitude; and using, by the OFDM receiver, the estimated integer carrier frequency offset value to receive the OFDM transmission.

2. The method of claim 1, further comprising:
determining, by the OFDM receiver, a coarse timing position; and
shifting a receive fast Fourier transform (FFT) window a predetermined amount relative to the coarse timing position.

3. The method of claim 2, wherein the receive FFT window is advanced relative to the coarse timing position.

4. The method of claim 2, wherein the receive FFT window is advanced by a number of samples equal to a length of a cyclic prefix used in the OFDM transmission.

5. The method of claim 1, wherein the first selected sub-carriers are adjacent sub-carriers, and the second selected sub-carriers are adjacent sub-carriers.

6. The method of claim 5, wherein one of the first selected sub-carriers is adjacent to one of the second selected sub-carriers.

7. The method of claim 5, comprising:
receiving, by the OFDM receiver, a synchronization symbol having a known pseudo random noise ePN) sequence to obtain received samples; and
performing, by the OFDM receiver, a fast Fourier transform on received samples within the FFT receive window to produce respective bin values corresponding to respective sub-carriers of the OFDM transmission.

8. The method of claim 7, where the products are computed using bin values of the fast Fourier transform and using the known PN sequence.

9. Apparatus for receiving an Orthogonal Frequency Division Multiplexing (OFDM) transmission, comprising:
means for, for each of a plurality of possible integer carrier frequency offset values, calculating a magnitude of a sum over selected sub-carriers of the OFDM transmission of products of a first quantity and a second quantity, wherein the first quantity is a difference between estimated channel responses of a first selected sub-carriers of the OFDM transmission, and the second quantity is a complex conjugate of a difference between estimated channel responses of a second selected sub-carriers of the OFDM transmission;
means for estimating as an integer carrier frequency offset value a possible integer carrier frequency offset value that produces the largest magnitude; and
means for using the estimated integer carrier frequency offset value to receive the OFDM transmission.

10. The apparatus of claim 9, further comprising:
means for determining a coarse timing position; and
means for shifting a receive fast Fourier transform (FFT) window a predetermined amount relative to the coarse timing position.

11. The apparatus of claim 10, wherein the receive FFT window is advanced relative to the coarse timing position.

12. The apparatus of claim 11, wherein the receive FFT window is advanced by a number of samples equal to a length of a cyclic prefix used in the OFDM transmission.

13. The apparatus of claim 9, wherein the first selected sub-carriers are adjacent sub-carriers, and the second selected sub-carriers are adjacent sub-carriers.

14. The apparatus of claim 13, wherein one of the first selected sub-carriers is adjacent to one of the second selected sub-carriers.

15. The apparatus of claim 13, comprising:
means for receiving a synchronization symbol having a known pseudo random noise (PN) sequence to obtain received samples; and
means for performing a fast Fourier transform on received samples within the FFT receive window to produce respective bin values corresponding to respective sub-carriers of the OFDM transmission.

16. The apparatus of claim 15, where the product is computed using bin values of the fast Fourier transform and using the known PN sequence.

17. An apparatus for receiving an Orthogonal Frequency Division Multiplexing (OFDM) transmission, comprising:
for each of a plurality of possible integer carrier frequency offset values, a calculator configured to calculate a magnitude of a sum over selected sub-carriers of the OFDM transmission of products of a first quantity and a second quantity, wherein the first quantity is a difference between estimated channel responses of a first selected sub-carriers of the OFDM transmission, and the second quantity is a complex conjugate of a difference between estimated channel responses of a second selected sub-carriers of the OFDM transmission;
an estimator configured to estimate as an integer carrier frequency offset value a possible integer carrier frequency offset value that produces the largest magnitude; and
an OFDM receiver configured to use the estimated integer carrier frequency offset value to receive the OFDM transmission.

18. The apparatus of claim 17, further comprising:
a determiner configured to determine a coarse timing position; and
a shifter configured to shift a receive fast Fourier transform (FFT) window a predetermined amount relative to the coarse timing position.

19. The apparatus of claim 18, wherein the receive FFT window is advanced relative to the coarse timing position.

20. The apparatus of claim 19, wherein the receive FFT window is advanced by a number or samples equal to a length of a cyclic prefix used in the OFDM transmission.

21. The apparatus of claim 17, wherein the first selected sub-carriers are adjacent subcarriers, and the second selected sub-carriers are adjacent sub-carriers.

22. The apparatus of claim 21, wherein one of the first selected sub-carriers is adjacent to one of the second selected sub-carriers.

23. The apparatus of claim 21, further comprising:
a sample receiver configured to receive a synchronization symbol having a known pseudo random noise (PN) sequence to obtain received samples; and
a transformer configured to perform a fast Fourier transform on received samples within the FFT receive window to produce respective bin values corresponding to respective subcarriers of the OFDM transmission.

24. The apparatus of claim 23, where the product is computed using bin values of the fast Fourier transform and using the known PN sequence.

* * * * *